United States Patent [19]

Ito et al.

[11] Patent Number: 5,244,587
[45] Date of Patent: Sep. 14, 1993

[54] FORGING LUBRICANT AND A METHOD FOR FORMING A LUBRICANT COAT ON THE SURFACE OF A LINEAR MATERIAL

[75] Inventors: Yukio Ito, Yokkaichi; Tadaya Ishibashi, Suita; Tadahiro Mori, Kyoto; Tadashi Akazawa, Shijonawate; Takao Noguchi, Osaka, all of Japan

[73] Assignees: Daido Machinery, Ltd.; Daido Tokushuko Kabushiki Kaisha; Unitika Ltd., Japan

[21] Appl. No.: 728,224

[22] Filed: Jul. 11, 1991

[30] Foreign Application Priority Data

Jul. 12, 1990 [JP] Japan .................................. 2-184988
Oct. 30, 1990 [JP] Japan .................................. 2-293350

[51] Int. Cl.$^5$ .......................................... C10M 125/00
[52] U.S. Cl. ........................................ 252/25; 252/28; 252/29; 252/30
[58] Field of Search ..................... 252/25, 28, 29, 30

[56] References Cited

U.S. PATENT DOCUMENTS

| | | | |
|---|---|---|---|
| 3,438,896 | 4/1969 | Council et al. .................. | 252/29 |
| 4,096,076 | 6/1978 | Spiegelberg ...................... | 252/28 |
| 4,270,348 | 6/1981 | Winberg ............................ | 252/28 |
| 4,787,991 | 11/1988 | Morozumi et al. ................ | 252/29 |

FOREIGN PATENT DOCUMENTS

| | | |
|---|---|---|
| 0163471 | 5/1985 | European Pat. Off. . |
| 0403306 | 6/1990 | European Pat. Off. . |
| WO90/15123 | 6/1990 | PCT Int'l Appl. . |
| 1498787A1 | 7/1987 | U.S.S.R. . |

OTHER PUBLICATIONS

Accession No. 87-253434 (JP-A-62-174 296 (Daido Tokushuko) Jul. 31, 1987.
Accession No. 89-074203 (JP-A-01-028 382 (Honda Corp.) Jan. 30, 1989.
JP-A-57 065 795 (Nippon Steel Corp.) Apr. 21, 1982.

*Primary Examiner*—Jacqueline V. Howard
*Attorney, Agent, or Firm*—Davis, Bujold & Streck

[57] ABSTRACT

A lubricant to be sprayed onto the surface of a steel material for forming a lubricant coat on the surface of the steel material to be forged. The lubricant comprises a particulate lubricant composed of thermally melting resin mixed with inorganic lubricant. The particulate lubricant is applied onto the surface of a steel material to be forged. Before or after applying the particulate lubricant onto the surface of the steel material, the surface of the steel material is heated. Consequently, the thermally melting resin melts and coheres with the inorganic lubricant over the surface of the steel material, resulting in the formation of a uniformly thick lubricant coat over the steel material. The lubricant coat prevents the steel material from being burnt in a forging device even during hot forging. The lubricant coat is fit for the forging of hard to work steel material. The lubricant coat also contributes to the decrease in forging cost, without deteriorating the forging environment.

8 Claims, 4 Drawing Sheets

FORGING LUBRICANT AND A METHOD FOR FORMING A LUBRICANT COAT ON THE SURFACE OF A LINEAR MATERIAL

BACKGROUND OF THE INVENTION

This invention relates to a lubricant used for forging a steel material, and particularly to a particulate lubricant to be sprayed on the surface of the steel material to form a lubricant coat thereon.

This invention also relates to a method for forming a lubricant coat on the surface of a linear material, for example, a wire rod.

Recently, automobile, electronic, electric, architectural and other industrial fields have increasingly required the reduction in the manufacturing cost of various parts. Consequently, the development of cold forging and warm or hot forging operations are increasingly demanded. Most parts are made of carbon steel and low alloy steel through cold forging. For the cold forging, a horizontal parts former, a vertical parts former, a vertical press and other devices are available. The vertical press incorporates structure for the dropping of mineral oil or emulsive lubricant onto the surface of a starting material. The starting material is thus prevented from being burnt in a metal mold during forging.

When small screws and other small parts are forged, after a linear material is cut into desired dimensions, forging is carried out. Usually, an oxalate coat is formed on the surface of the linear material to be forged. The oxalate coat lubricates the surface of the linear material and prevents the linear material from being burnt in a metal mold. According to the type of the parts to be forged, in addition to the oxalate coat, lubricating oil is dropped onto the surface of the linear material to enhance the lubricating performance.

When the lubricating oil is dropped, the lubricating oil is scattered around, thereby deteriorating the environment. Since the lubricating oil lacks in heat resistance, the lubricating oil is also inappropriate for hot forging. Further, the lubricating oil provides insufficient lubricating performance, and is also inappropriate for hard to work materials.

To form the oxalate coat on the surface of the linear material, linear material in the form of a coil is soaked in a solution tank containing oxalate solution. The surface of the linear material in the solution tank, however, has some portions to which the oxalate solution is hard to adhere, irrespective of a lubricant coat forming method, for example, through the chemical reaction or just the application of the oxalate solution. Even when a more effective lubricant solution is developed to form a lubricant coat appropriate for forging hard to work materials, forging steps need to be complicatedly combined with the steps for forming a lubricant coat. Furthermore, the soaking of the linear material in the solution tank increases manufacturing cost.

To solve these problems, a method for forming a uniformly thick and effective lubricant coat has been developed. As a result, a method for forming the lubricant coat by electrostatically spraying a particulate lubricant is proposed. A lubricant used for forming a lubricant coat on the surface of hard to work materials, however, has not been developed.

SUMMARY OF THE INVENTION

Wherefore, an object of this invention is to provide a lubricant which is fit for forming an effective lubricant coat easily on the surface of a steel material easily through electrostatic spray and for preventing the steel material from being burnt during hot forging.

Another object of this invention is to provide a method for forming a uniformly thick and effectively adhering lubricant coat on the surface of a linear material.

According to the invention there is provided a lubricant to be sprayed onto the surface of a steel material for forming a lubricant coat on the surface of the steel material to be forged. The lubricant comprises a particulate lubricant of a thermally melting resin mixed with an inorganic lubricant.

The lubricant is appropriate for an electrostatic application, in which the particulate lubricant is charged and blown into a closed space adapted to receive the steel material which has been electrically grounded.

When the lubricant is used at high temperature, for example, for the hot forging of the material, a resin that melts at the forging temperature is more effective. The lubricant of this invention is also applicable for cold forging. During the cold forging, however, the melting point of the resin does not have to equal the forging temperature. In the invention, polyolefin resin, polyethylene resin, polyurethane resin, polyester resin, polyamide resin, polyvinyl alcohol resin, polyfluoroethylene resin, ethylenevinyl acetate copolymer, petroleum wax, polyacrylic resin, polystyrene resin, and other resin could be used. Polyvinyl alcohol resin, polyester resin and polyfluoroethylene resin are preferable.

The softening point of the thermally melting resin is typically 30= C. or higher. When the softening point is less than 30= C., the particulate lubricant is easily formed into blocks in an applicator. The preferable softening point depends on the forging temperature of the steel material. The thermally melting resin needs to soften at the forging temperature of the steel material and provide a lubricating performance. Therefore, for cold forging operations, a resin having a low softening point is desirable. For the cold forging operations, the particulate lubricant is electrostatically sprayed to the steel material, the steel material is then heated to melt the resin composing the particulate lubricant, and the lubricant coat is adhered onto the surface of the steel material.

For hot forging, when the forging temperature is between 300= C. and 400= C., the resin having low softening point has such a low melt viscosity to flow. Consequently, the resin is required to have a high softening point and high melt viscosity.

The above-mentioned softening point corresponds to a generally defined softening point. For example, Iwanami Science and Chemical Dictionary No.3 published by Kabushiki Kaisha Iwanami Shoten defines that the softening point is the temperature at which the viscosity coefficient of a material is substantially between $10^{11}$ and $10^{12}$ poise and the material is found flow in about one to ten seconds.

To compose the lubricant of the invention, an inorganic lubricant such as titanium oxide, colloidal silica, bentonite clay, glass powder, talc, graphite fluoride, carbon or mica is used. Glass powder is preferable, because its softening point can be adjusted for any purpose. The preferable inorganic lubricant melts during the forging of the steel material, does not scratch on the surface of the steel material and forms into a thin coat.

For hot forging, the preferable inorganic lubricant is glass powder with a melt viscosity of about 1000 poise or less at the forging temperature. When the amount of the steel material to be forged is small and the steel material is forged at a low temperature, an inorganic lubricant which does not melt at the forging temperature is sufficient. This inorganic lubricant preferably has low hardness and a small particulate diameter. For example, titanium oxide and colloidal silica are preferable. An inorganic lubricant with a large particulate diameter would scratch the surface of the steel material.

The mixture ratio of the resin and the inorganic lubricant in the invention is between 1:99 and 99:1 by weight, preferably between 5:95 and 90:10. The mixture ratio depends on the forging amount and forging temperature of the steel material. For example, when the steel material is forged by a small amount and at low temperature, the mixture ratio of the resin should be large. If the steel material is forged by a large amount and at a high temperature, the mixture ratio of the inorganic lubricant should be increased, thereby preventing the steel material from being burnt and the resin from flowing.

In addition to the softening point of the resin and the mixture ratio of the inorganic lubricant, the melt viscosity of the mixture of the resin and the inorganic lubricant at the forging temperature is also important. The melt viscosity of the mixture at the forging temperature is between 50 poise and 100000 poise, but preferably is between 100 poise and 10000 poise. When the melt viscosity is less than 50 poise, the mixture sags and soils the environment during forging.

To obtain a desirable melt viscosity, the softening point of the resin and the mixture ratio of the resin and the inorganic lubricant need to be adjusted. To adjust the melt viscosity, a known thickener such as colloidal silica, clay, talc, titanium oxide, or calcium carbonate can be mixed.

In one method for mixing the resin and the inorganic lubricant, the particles of the resin are mixed with those of the inorganic lubricant. An alternate method is provided whereby, after the inorganic lubricant is melted or dissolved into the resin, the mixture of the inorganic lubricant and the resin is ground into particles. In a further method, the surface of particulate inorganic lubricant is coated with the resin. These and other methods are available for mixing the resin and the inorganic lubricant. Blocking preventive, fire proof resin, silicone lubricant, fluoro lubricant and other lubricant can be also added to the mixture of the resin and the inorganic lubricant.

According to the invention there are also provided methods for forming a lubricant coat on the surface of a linear material, using a particulate lubricant comprising a thermally melting lubricating substance or comprising the mixture of a thermally melting substance and a lubricating substance. A first method comprises the steps of electrically grounding the linear material, concurrently conveying the linear material through an electrostatic spray chamber containing charged and sprayed particulate lubricant and heating the surface of the linear material to the temperature range corresponding to the melting point of the thermally melting substance of the particulate lubricant. A second method comprises the steps of heating the linear material to the temperature range corresponding to the property of the thermally melting of the particulate lubricant, concurrently electrically grounding the linear material and conveying the linear material through an electrostatic spray chamber containing charged and sprayed particulate lubricant.

According to the invention, since the lubricant is particulate, the lubricant is sprayed onto the steel material through the electrostatic application method. The resin composing the lubricant sprayed on the surface of the steel material melts at the forging temperature. When the resin does not melt at the forging temperature, the resin is melted by heating the steel material, thereby adhering the inorganic lubricant onto the steel material. The particulate lubricant can also be adhered to the steel material through the electrostatic application method before heating the steel material and before melting the resin. Since the resin thus thermally melts to adhere over the surface of the steel material uniformly, a uniformly thick lubricant coat can be formed, as contrasted with the conventional prior art application method in which the steel material is soaked in the oxalate solution. When the electrostatic application method is used, the particulate lubricant is uniformly sprayed onto the steel material, thereby resulting in a more effective lubricant coat.

When the mixture of resin and inorganic lubricant has the melt viscosity between 50 poise and 100,000 poise at the forging temperature, the mixture is uniformly spread and adhered onto the surface of the steel material, without sagging during hot forging. By melting the resin, the lubricant coat has a fluidity that follows the configuration of the steel material being forged. The forging efficiency is thus enhanced.

The lubricant coat can be uniformly and easily formed using the lubricant according to the invention. The inorganic lubricant composing the lubricant provides sufficient lubricating performance and improves the forgeability of the steel material. The steel material is therefore prevented from being burnt in a metal mold.

By selecting an inorganic lubricant appropriately, the sufficient lubricating performance can be obtained. In this invention, the thermally melting resin coheres with the inorganic lubricant on the surface of the steel material, thereby forming the lubricant coat that follows the configuration of the steel material being forged during hot forging. In this invention, the optimum lubricant for hard to work materials can therefore be easily obtained.

According to the first method of this invention, as the electrically grounded linear material passes through the electrostatic spray chamber, the electrically charged particulate lubricant is attracted onto the surface of the linear material, due to the coulomb force resulting from the potential difference between the particulate lubricant and the linear material. Since the linear material is electrically grounded, the particulate lubricant is uniformly attracted over the surface of the linear material in the electrostatic spray chamber. After the particulate lubricant is attracted onto the surface of the linear material, the surface of the material is heated to the temperature range corresponding to the melting point of the thermally melting substance of the particulate lubricant. The thermally melting substance of the particulate lubricant subsequently melts and adheres over the surface of the linear material. Concurrently, the lubricating substance of the particulate lubricant, which does not melt thermally, coheres with the thermally melting substance of the particulate lubricant on the surface of the linear material. The particulate lubricant uniformly adheres to the surface of the linear material, resulting in a uniformly thick lubricant coat. This uniform lubricant coat prevents the forged linear material from being burnt in the forging device and provides a sufficient lubricating performance. The lubricating performance can be further improved by selecting a lubricating substance fit for its purpose and thereby adjusting the thickness of the lubricant coat.

According to the second method of this invention, since the linear material is preheated, the particulate lubricant adheres uniformly onto the surface of the linear material through the coulomb force while melting at the same time, thereby forming into an effective lubricant coat.

When the first and second methods are combined with an inline type forging device, forging efficiency is further enhanced.

In the first method, a lubricant coat forming member comprises a member for supplying a coiled linear material into the forging member, and a member for electrically grounding the coiled linear material via a support roller or other member in contact with the coiled linear material being supplied. The inline type forging device also comprises an electrostatic spray chamber for adhering the particulate lubricant onto the surface of the linear material being supplied, and a heating means for heating the surface of the linear material having left the electrostatic spray chamber to a predetermined temperature. The surface of the linear material is heated with infrared rays or by an induction heater. The linear material is then supplied from the lubricant coat forming member into a forging member. Consequently, the forging efficiency is enhanced. The effective lubricant coat formed on the surface of the linear material prevents the linear material from being burnt.

In the second method, the heating member is provided before the linear material is exposed to the electrostatic spray chamber. The surface of the linear material is first heated with directly conducted electric current or by an induction heater.

Various kinds of particulate lubricant can be applied to these first and second methods. For example, when the first method is combined with an inline type forging device for cold forging, the particulate lubricant is composed of the mixture of inorganic salt as a lubricating substance and low melting polyethylene or low melting polyvinyl alcohol as a thermally melting substance having the melting point between 50= C. and 60= C. After the linear material passes through the electrostatic spray chamber, the linear material with the particulate lubricant adhering the surface thereof is heated to between 50= C. and 60= C. The low melting polyethylene melts and adheres over the surface of the linear material, thereby forming the uniformly thick lubricant coat containing the inorganic salt.

For warm forging, a particulate lubricant is selected according to the forging temperature, for example, a particulate lubricant is composed of usual polyethylene resin having a melting point between about 80= C. and 100= C. and low melting glass as a lubricating substance. The linear material is heated between 80= C. and 100= C., corresponding to the melting point of polyethylene. The second method of this invention applies, because in the method the linear material is heated before fed into the electrostatic spray chamber. The first method, however, could also apply.

The substance which melts at a relatively low temperature and also has a lubricating performance, such as stearate, could be used as an individual particulate lubricant.

DETAILED DESCRIPTION OF THE PREFERRED EMBODIMENTS

Figure 1:
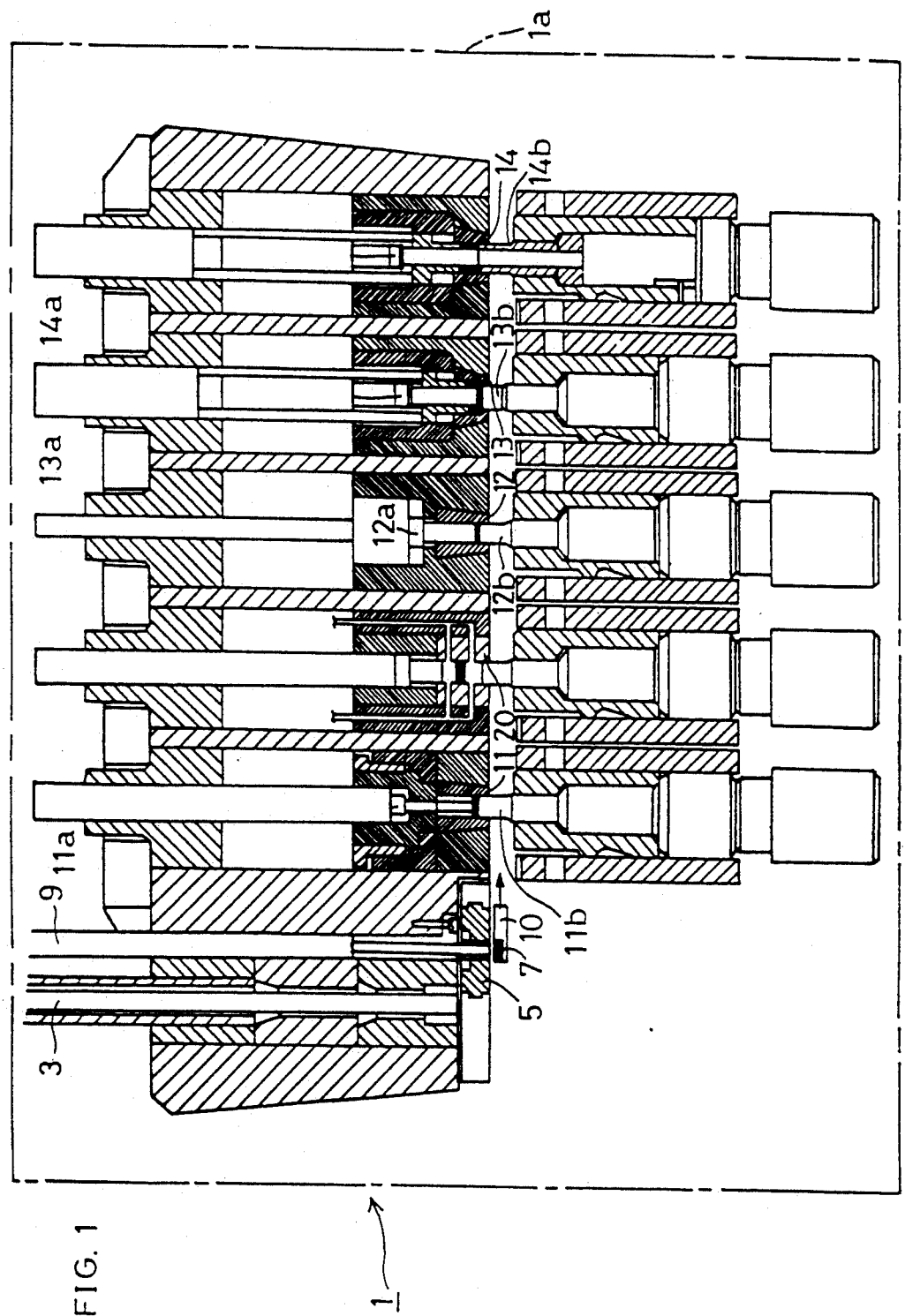
FIG. 1 is a cross-sectional view of a forging device embodying the invention.
Figure 2:
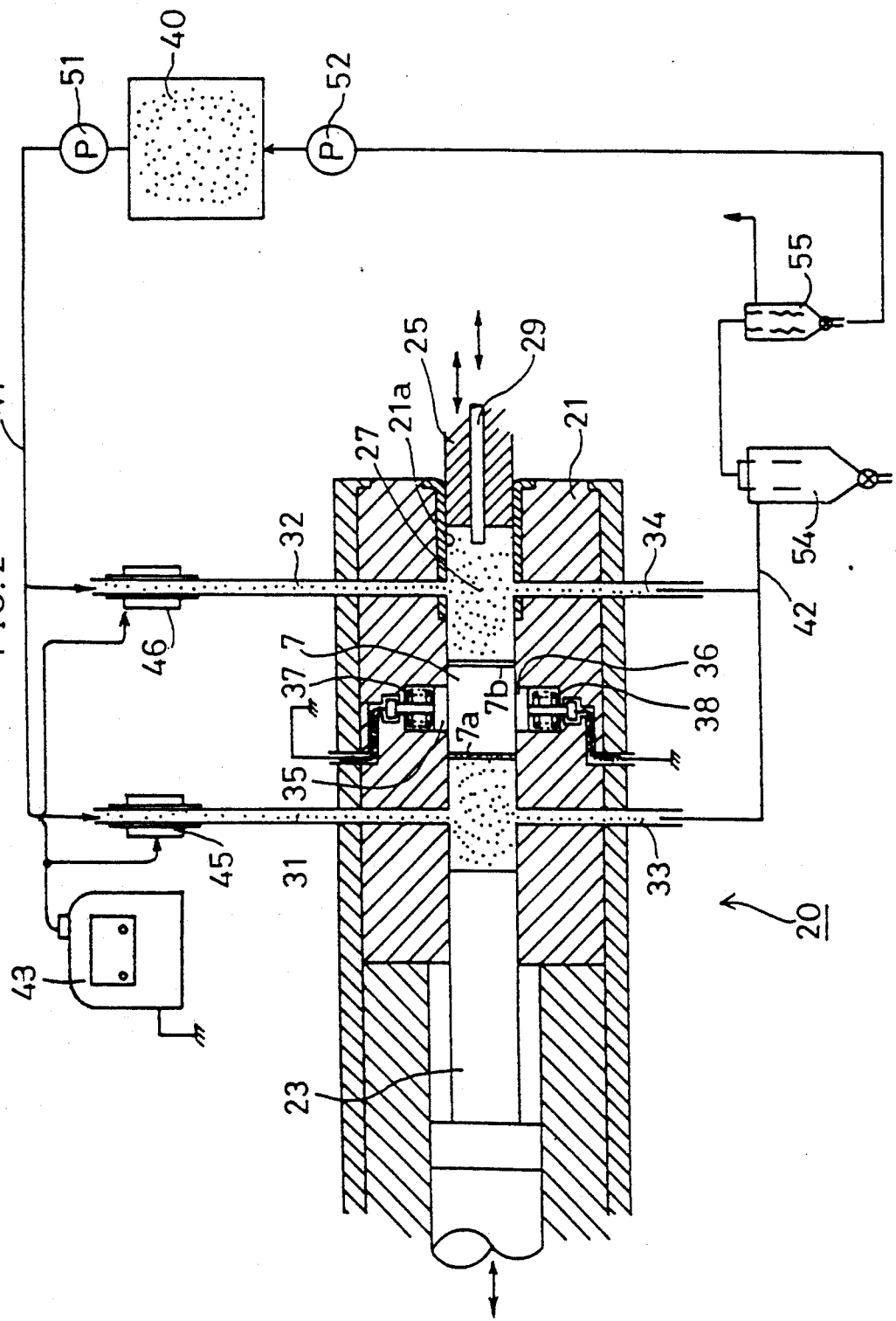
FIG. 2 is a cross-sectional view of a lubricant coat forming member in the forging device.
Figures 3A, 3B, 3C, 3D, 3E:
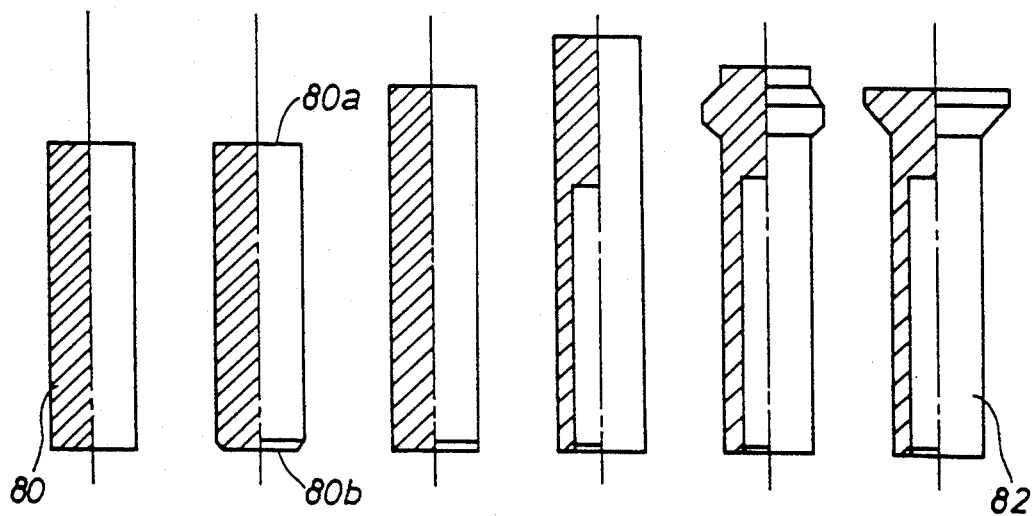
FIGS. 3A through 3E are explanatory views showing the configuration at each forging step of a SUS430 steel anchor bolt.

In the embodiments, a SUS430 steel is forged into an anchor bolt using the forging device shown in FIGS. 1 and 2 by means of the steps shown in FIGS. 3A through 3E.

As shown in FIG. 1, a forging device 1 is an inline type device for cutting a steel material before forging. A starting material 3 in the form of a coil is straightened by a pinch roller (not shown), preheated by a heating device (not shown), and guided into a body 1a. The starting material 3, in turn, is cut into slugs 7, having predetermined dimensions, by a cutter 5 movable in the body 1a. Each of the slugs 7 is pushed out of the cutter 5 by a pusher 9 and caught by a transfer device 10. The slugs 7 held by the transfer device 10 are fed through a first metal mold 11, a second metal mold 12, a third metal mold 13, a fourth metal mold 14 and other successive metal molds (not shown) for forging. In the forging device 1 an electrostatic lubricant applicator 20 is interposed between the first metal mold 11 and the second metal mold 12 to form, as shown in FIG. 2, a lubricant coat on both cut end surfaces 7a and 7b of each slug 7.

The applicator 20 is detachably assembled into the forging device 1 in the same way as the first through fourth metal molds 11, 12, 13 and 14. As shown in FIG. 2, the applicator 20 comprises a cylindrical body 21, which is composed of electrically insulating material and has a central bore 21a therein. One end of the central bore 21a is closed by a knockout pin 23. A punch 25 extends into the other end of the central bore 21a to close that other end. By closing the central bore 21a completely by means of the knockout pin 23 and the punch 25, a lubricant coat forming space 27 is formed in the central bore 21a. The knockout pin 23 is structurally and operationally the same as knockout pins 11a, 12a, 13a and 14a provided in the first, second, third and fourth metal molds 11, 12, 13 and 14, respectively. The punch 25 is structurally and operationally the same as forging punches 11b, 12b, 12b and 14b provided in the first, second, third and fourth metal molds 11, 12, 13, and 14, respectively, except that the punch 25 comprises a double casing and has a pin 29 therein. The pin 29 is driven separately from the punch 25, and is movable into and out of the lubricant coat forming space 27. The central bore 21a in the cylindrical body 21 has almost the same diameter as the outer diameter of the slug 7 forged in the first metal mold 11. The inlet end of the central bore 21a is strengthened by a bushing. Lubricant supply passages 31 and 32, and lubricant exit passages 33 and 34 are formed of an electrically insulating material in the central bore 21a. One end of the lubricant supply passages 31 and 32 open through the side wall of the cylindrical body 21 opposite one end of the lubricant exit passages 33 and 34 which open into the central bore 21a. The cylindrical body 21 of the applicator 20 also has slugs 35 and 36 composed of conductive material. The slugs 35 and 36 are placed diametrically opposite one another in the side walls of the bore 21a around the center thereof. The slugs 35 and 36 are urged into and out of the lubricant coat forming space 27 by coil springs 37 and 38 provided behind the slugs 35 and 36, respectively. Each of the slugs 35 and 36 is electrically grounded.

The lubricant supply passages 31 and 32 are branched from a supply passage 41. The supply passage 41 is composed of electrically insulating material and leads from a lubricant container 40 containing powdered lubricant. On the other hand, the lubricant exit passages 33 and 34 join to form a feed passage 42 leading to the lubricant container 40. The feed passage 41, the lubricant supply passages 31, 32, the lubricant exit passages 33, 34, and the feed passage 42 thus form a closed loop for supplying and collecting the powdered lubricant from and to the lubricant container 40. After the supply passage 41 has been branched, electrical charge elements (coils) 45 and 46 are provided on the lubricant supply passages 31 and 32, respectively. The elements 45 and 46 permit corona discharge from a high voltage power source 43 at direct current high voltage. The high voltage power source 43 supplies the voltage of 80kV to the elements 45 and 46.

The procedure followed in the lubricant coat forming operation by the forging device 1 will now be explained. After completing the light forging of the slug 7 in the first metal mold 11, the slug 7 is moved by the transfer device 10 toward the inlet of the cylindrical body 21 of the applicator 20. Subsequently, the slug 7 is forced by the punch 25 into the inlet of the central bore 21a in the cylindrical body 21. At the same time, the punch 25 closes the inlet of the central bore 21a, thereby forming the lubricant coat forming space 27 completely closed. Subsequently, the pin 29 is driven to force the slug 7 further into the lubricant coat forming space 27. The slug 7 is then engaged by the slugs 35 and 36 and the pin 29 retreats into the punch 25. The slug 7 is electrically grounded by the slugs 35 and 36 and held in the completely closed lubricant coat forming space 27.

The powdered lubricant is pumped by a feed pump 51 from the lubricant container 40 to the elements 45 and 46, in which the powdered lubricant is charged with a high voltage. The powdered lubricant from the elements 45 and 46 is introduced via the lubricant supply passages 31 and 32 into the lubricant coat forming space 27. Subsequently, the powdered lubricant in the lubricant coat forming space 27 is electrostatically attracted onto the cut end surfaces 7a and 7b of the slug 7 using the coulomb force resulting from the potential difference between the powdered lubricant and the slug 7. Since the electric potential is uniformly zero over the cut end surfaces 7a and 7b of the slug 7, a uniformly thick lubricant coat is formed over the cut end surfaces 7a and 7b. The excess of the powdered lubricant is taken by a return pump 52 from the lubricant coat forming space 27 through the lubricant exit passages 33 and 34 back to the lubricant container 40. In the lubricant exit passages 33 and 34, a cyclone dust collector 54 removes coarse particles and an exhaust filter 55 removes fine particles. The slug 7 with the lubricant coat formed on the cut end surfaces 7a and 7b is pushed out of the cylindrical body 21 of the applicator 20 by the knockout pin 23 driven forward. Subsequently, the slug 7 is caught by the transfer device 10 and transferred to the second metal mold 12.

In the forging device 1 having the aforementioned structure, the SUS430 steel was forged into the anchor bolt through the steps shown in FIGS. 3A through 3E, using the lubricant prepared for first through fourth embodiments described later. According to the configuration of the parts and the number of the forging steps, the subassemblies of the metal molds 11, 12, 13 and 14 were assembled into or disassembled from the forging device 1. The materials of the forging punches 11b, 12b, 13b, and 14b of the metal molds 11, 12, 13 and 14 are shown in Table 1.

TABLE 1

| CONTENT | SINTERED STEEL CORRESPONDING TO SKH53 % BY WEIGHT |
|---|---|
| C | 1.3 |
| Cr | 4.0 |
| Mo | 5.0 |
| W | 6.5 |
| V | 3.0 |
| HARDNESS (HRC) | 65 |

The softening point referred to in subsequent discussion is the temperature at which the temperature of resin is raised at the speed of 1= C./minute and measured by a needle having a diameter of 3 mm that enters the resin to a depth of 1 mm. In the embodiments, the softening point is based on such measuring conditions, but it is typically the same as the generally defined softening point in terms of its properties.

FIRST EMBODIMENT

80% by weight of copolymer polyester resin having the softening point of 110= C. and 20% by weight of glass having the transition temperature of 504= C. were kneaded by a melting kneading machine at 250= C., chipped, and ground into particles by a grinder, thereby resulting in the particulate lubricant for the forging steps having an average particle diameter of 70 μm.

In the forging device 1, the starting material 3 of SUS430 steel was first cut into slugs 80, the particulate lubricant prepared as above was applied onto cut end surfaces 80a and 80b of the slugs 80, and the slugs 80 were then forged into anchor bolts 82 through the steps shown in FIGS. 3A through 3E.

The starting material 3 was preheated at 200= C. before forging. The number of manufacture resulting from the first embodiment is shown in Table 2. The number of manufacture indicates the number of the products which were manufactured by the forging device 1 without replacement of any forging punch. A larger number of manufacture indicates the better forgeability.

SECOND AND THIRD EMBODIMENTS

15% by weight of polyvinyl alcohol particles and 85% by weight of glass particles were blended by a blender, resulting in a particulate lubricant for the forging steps. The polyvinyl alcohol particles had a softening point of 196= C. and an average particle diameter of about 30 μm, while the glass particles had a transition temperature of 504= C. and an average particle diameter of about 50 μm.

In the forging device 1, in much the same way as detailed in the first embodiment, the starting material 3 of SUS430. steel was cut into the slugs 80, the particulate lubricant prepared as above was applied onto the cut end surfaces 80a and 80b of the slugs 80, the slugs 80 were then forged into the anchor bolts 82 through the steps shown in FIGS. 3A through 3E.

For the second embodiment, the starting material 3 was preheated at 200= C. before forging. For the third embodiment, the starting material 3 was preheated at 400= C. The number of manufacture resulting from these embodiments is shown in Table 2.

FOURTH EMBODIMENT

75% by weight of 4-fluoroethylene resin particles and 25% by weight of titanium oxide particles were blended by a blender, resulting in the particulate lubricant for the forging steps. The 4-fluoroethylene resin particles had a softening point of 330= C. and an average particle diameter of about 40 $\mu$m, while the titanium oxide particles had an average particle diameter of about 0.5 $\mu$m.

In the forging device 1, in the same way as detailed in the first embodiment, the starting material 3 was cut into the slugs 80, the particulate lubricant prepared as above was applied onto the cut end surfaces 80a and 80b of the slugs 80, and the slugs 80 were then forged into the anchor bolts 82 through the steps shown in FIGS. 3A through 3E.

The starting material 3 was preheated at 400= C. before forging. The number of manufacture resulting from the fourth embodiment is shown in Table 2.

FIRST AND SECOND COMPARISONS

In the forging device 1, in the same way as the embodiments, the starting material 3 of SUS430 steel was cut into the slugs 80, and the slugs 80 were forged into the anchor bolts 82 through the steps shown in FIGS. 3A through 3E. Different from the embodiments, lubricating oil was applied onto the cut end surfaces 80a and 80b of the slug 80, instead of using the particulate lubricant. The starting material 3 was preheated at 200= C. and 400= C. before forging. The number of manufacture resulting from these comparisons is shown in Table 2. A lubricating oil having the tradename of "Neocool SPH-3B" and manufactured by Matsumura Sekiyu in Japan was used.

As clearly shown in Table 2, the particulate lubricant applied on the cut end surfaces 80a and 80b of the slug 80 of the SUS430 steel contributes to the increase in the number of manufacture. The particulate lubricants for the first through fourth embodiments effectively increased the number of manufacture from the hard to work SUS430 steel material. In the second comparison, the SUS430 steel material was unable to be forged, because the lubricating oil was not able to resist high temperatures and the steel material was burnt in the metal mold.

TABLE 2

| | MATERIAL HEATING TEMPERATURE (°C.) | THE NUMBER OF MANUFACTURE |
|---|---|---|
| FIRST EMBODIMENT | 200 | 115,000 |
| SECOND EMBODIMENT | 200 | 120,000 |
| THIRD EMBODIMENT | 400 | 210,000 |
| FOURTH EMBODIMENT | 400 | 235,000 |
| FIRST COMPARISON | 200 | 26,000 |

TABLE 2-continued

| | MATERIAL HEATING TEMPERATURE (°C.) | THE NUMBER OF MANUFACTURE |
|---|---|---|
| SECOND COMPARISON | 400 | UNABLE TO BE FORGED |

A method for electrostatically spraying particulate lubricant onto the surface of the linear material to be forged is now explained.

Figure 4:
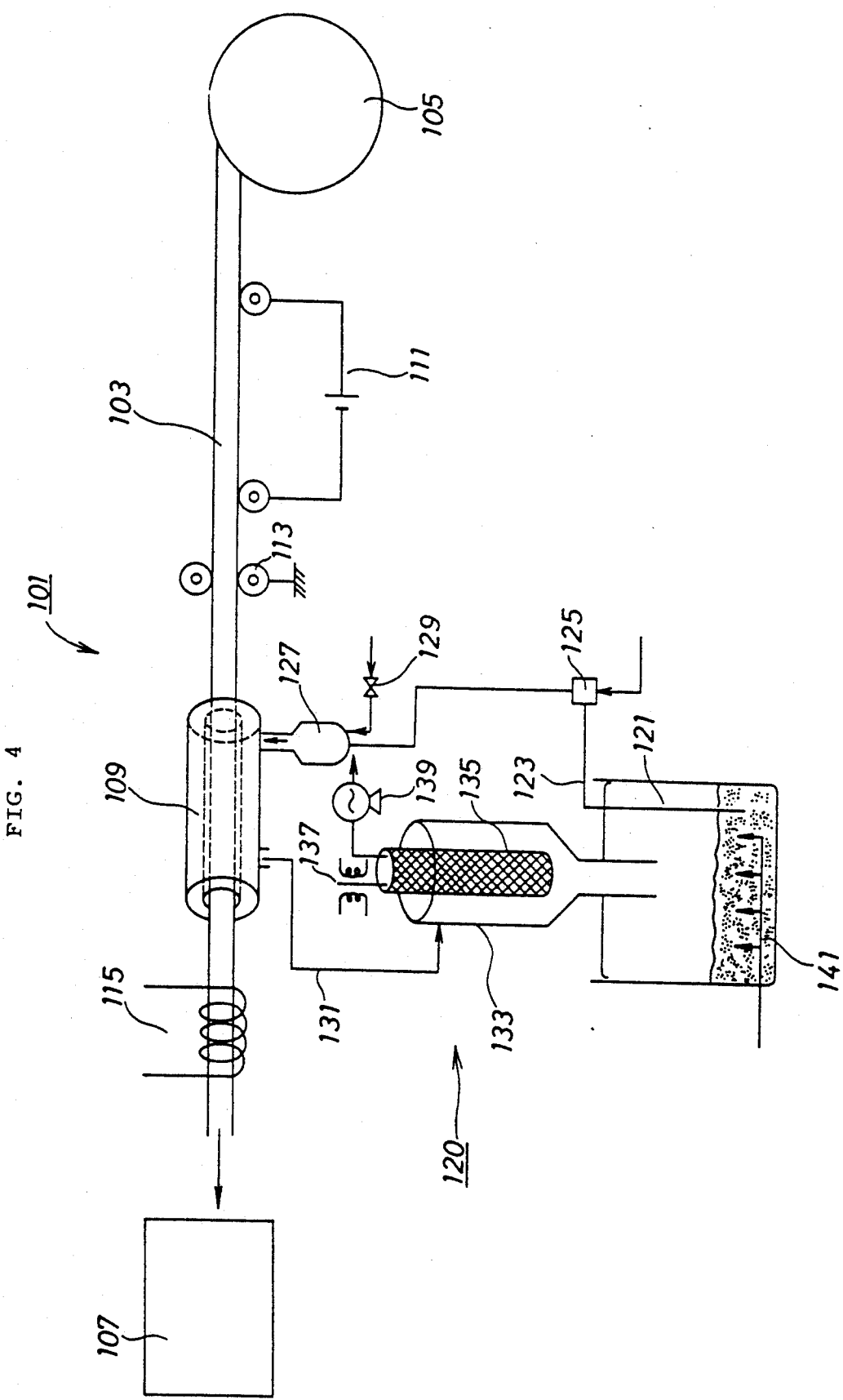
FIG. 4 is a schematic view of another lubricant coat forming member.

As shown in FIG. 4, a lubricant coat forming device 101 is provided before a forging device 107 of an inline cutting type.

In the lubricant coat forming device 101 a supply roller 105 is attached for supplying a linear material 103 in the form of a coil through the lubricant coat forming device 101. An electrostatic spray chamber 109 is interposed between the supply roller 105 and the forging device 107. A direct conductive heating unit 111 is interposed between the supply roller 105 and the electrostatic spray chamber 109. The linear material 103 is supported by earth rollers 113 interposed between the direct conductive heating unit 111 and the electrostatic spray chamber 109. An induction heating unit 115 is provided between the electrostatic spray chamber 109 and the forging device 107. The linear material 103 is supplied from the supply roller 105 through the direct heating unit 111, the earth rollers 113, the electrostatic spray chamber 109 and the induction heating unit 115 into the forging device 107 of inline cutting type.

The lubricant coat forming device 101 also comprises an applicator 120 for supplying the particulate lubricant into the electrostatic spray chamber 109. The applicator 120 comprises a dispersing tank 121 for containing the particulate lubricant, a draft piping 123 for introducing the particulate lubricant from the dispersing tank 121 into the electrostatic spray chamber 109, an air supply unit 125 for supplying air to the draft piping 123, and an electrostatic charger 127 attached to the end of the draft piping 123. The electrostatic charger 127 permits corona discharge from a high voltage power source (not shown) at direct current high voltage and charges the particulate lubricant at the end of the draft piping 123. The particulate lubricant is thus charged and sprayed into the electrostatic spray chamber 109.

The particulate lubricant is charged and sprayed through the applicator 120 into the electrostatic spray chamber 109. The electrostatic charger 127 is provided with a valve 129. Air is blown through the valve 129 into the electrostatic charger 127. The concentration of the sprayed particulate lubricant is adjusted using the air blown through the valve 129.

To collect surplus particulate lubricant, the applicator 120 comprises a lubricant exit passage 131 and a cyclone dust collector 133. The surplus particulate lubricant is collected through the lubricant exist passage 131 into the cyclone dust collector 133, which filters and feeds the collected particulate lubricant back into the dispersing tank 121 for recycling. The cyclone dust collector 133 is provided with a bag filter 135 and a vibrator 137. The bag filter 135 is vibrated by the vibrator 137, removes coarse particles from the particulate lubricant, and feeds the particulate lubricant to a fan 139. The fan 139, in turn, removes fine particles from the particulate lubricant. Consequently, the particulate lubricant with a particle diameter of about 30 $\mu$m is fed in the dispersing tank 121. New particulate lubricant supplied into the dispersing tank 121 also has a particle diameter of about 30 μ. An air inlet 141 is provided at the bottom of the dispersing tank 121. Air is blown through the air inlet 141 into the dispersing tank 121, thereby preventing the particulate lubricant from being formed into blocks and keeping the particulate lubricant being dispersed in the dispersing tank 121.

FIFTH EMBODIMENT

80% by weight of copolymer polyester resin having the softening point of 110= C. and 20% by weight of titanium oxide were kneaded by a melting kneading machine at 250= C., chipped and ground into particles by a grinder, thereby resulting in the particulate lubricant having the average particle diameter of about 30 μm.

The linear material 103 of SUS304 steel was preheated to 180° C. and fed through the electrostatic spray chamber 109, in which the particulate lubricant was applied to the surface of the linear material. The linear material was cooled and a lubricant coat was formed on the surface of the linear material. The linear material with the lubricant coat formed thereon was formed into small screws through cold forging by a parts-forming member in the forging device 107, without using the lubricating oil.

The forging device 107 was operated for ten hours for cold forging of the small screws from the linear material 103 with the lubricant coat formed thereon from the particulate lubricant of the fifth embodiment. During the cold forging, the linear material 103 was kept from being burnt in the metal mold in the forging device 107. The particulate lubricant was kept from being scattered, different from the lubricating oil. The good forging environment was assured accordingly.

The operation of the lubricant coat forming device 101 shown in FIG. 4 for forming the lubricant coat on the surface of the linear material 103 is now explained.

The cold forging is first explained. For cold forging, the linear material 103 is at room temperature before being fed into the forging device 107 of the inline cutting type. The first method of this invention is applied to the cold forging. As a particulate lubricant, a mixture of low melting polyethylene, low melting polyvinyl alcohol and inorganic salt is used. The low melting polyethylene and the low melting polyvinyl alcohol have a melting point between 50= C. and 60= C. The particle diameter of the particulate lubricant is adjusted between 40 μm and 50 μm. The particulate lubricant prepared as above is contained in the dispersing tank 121. The linear material 103 is attached to the supply roller 105. Subsequently, the lubricant coat forming device 101 is driven, while the direct heating unit 111 is not driven. The linear material 103 is supplied from supply roller 105, electrically grounded by the earth rollers 113, and is fed through the electrostatic spray chamber 109, in which the particulate lubricant having been charged by the applicator 120 is sprayed. Coulomb force acts between the particular lubricant and the linear material 103, resulting from the potential difference therebetween. Since the electric potential is uniformly zero over the surface of the linear material 103, the particulate lubricant is uniformly attracted onto the surface of the linear material 103, corresponding to the length of the electrostatic spray chamber 109. The linear material 103 with the particulate lubricant attracted uniformly onto the surface thereof is introduced from the electrostatic spray chamber 109 to the induction heating unit 115. In the induction heating unit 115 the surface of the linear material 103 is heated to between 50= C. and 60= C. As a result, the low melting polyethylene and the low melting polyvinyl alcohol are melted to adhere over the surface of the linear material 103. The inorganic salt coheres to the melted polyethylene and polyvinyl alcohol over the surface of the linear material 103. Consequently, the particulate lubricant is formed into a lubricant coat adhering over the surface of the linear material 103.

When the linear material 103 passes through the induction heating unit 115, the surface of the linear material 103 is slightly heated to such a degree that the low melting polyethylene and polyvinyl alcohol are melted. Therefore, the surface of the linear material 103 has almost reached room temperature, before the linear material 103 is fed into the forging device 107 for cold forging. The temperature of the surface of the linear material 103 is suitable for cold forging. During cold forging a uniformly thick lubricant coat formed on the surface of the linear material 103 prevents the linear material 103 from being burnt in the forging device 107.

Warm forging of the linear material 103 at the temperature between 80= C. and 100= C. is now explained. The second method of this invention applies to warm forging. As the particulate lubricant, a mixture of polyethylene and low melting glass is used. The melting point of polyethylene is between 80= C. and 100= C., the same as the forging temperature.

For warm forging, the direct conductive heating unit 111 is driven to heat the linear material 103 to between 80= C. and 100= C., before the linear material 103 is fed into the electrostatic spray chamber 109. The induction heating unit 115 is not driven, as opposed to the cold forging operation. Therefore, in the electrostatic spray chamber 109, the particulate lubricant concurrently melts and adheres uniformly over the surface of the linear material 103, thereby forming a uniformly thick lubricant coat on the surface of the linear material 103.

The thicknesses of the lubricant coats both for warm forging and cold forging are adjusted according to either or all of the feed speed of the linear material 103, the length of the electrostatic spray chamber 109 and the amount of the sprayed particulate lubricant. The lubricating performance of the particulate lubricant is adjusted according to the type of inorganic salt or the particulate lubricant itself.

As aforementioned, both the first and second methods can apply to the lubricant coat forming device 101. In both methods, the potential difference between the charged particulate lubricant and the grounded surface of the linear material 103 is uniform. The particulate lubricant is uniformly attracted onto the surface of the linear material 103 in the electrostatic spray chamber 109. In the first method, the linear material 103 with the particulate lubricant attracted uniformly onto the surface thereof is introduced from the electrostatic spray chamber 109 to the induction heating unit 115. In the induction heating unit 115 the low melting polyethylene and the low melting polyvinyl alcohol are melted to adhere over the surface of the linear material 103. For the warm forging, the linear material 103 is heated by the direct conductive heating unit 111 before being fed into the electrostatic spray chamber 109. In the electrostatic spray chamber 109, the particulate lubricant concurrently melts and adheres uniformly over the surface of the linear material 103. The uniformly thick lubricant coat thus formed effectively prevents the linear material 103 from being burnt in the metal mold of the forging device 107. The combination of the lubricant coat forming device 101 and the forging device 107 simplifies the process steps for forging the linear material 103 and enhances the forging efficiency.

This invention has been described above with reference to the preferred embodiments as shown in the drawings Modifications and alterations may become apparent to one skilled in the art upon reading and understanding the specification. Despite the use of the embodiments for illustration purposes, however, it is intended to include all such modifications and alterations within the scope and spirit of the appended claims.

For example, the particulate lubricant is not limited to the above specified. The type of particulate lubricant could be selected according to the desired lubricating performance and the forging temperature.

The dropping of lubricating oil could be combined with the lubricant coat forming. The invention is not limited to the method for forming a lubricant coat to specify the lubricating performance.

Wherefore, having thus described the present invention,

What is claimed is:

1. An electrostatically charged and sprayable lubricant for forming a lubricant coating on the surface of an electrically grounded steel material to be forged, and on which said lubricant is electrostatically sprayed, comprising:

an electrostatically charged particulate lubricant of thermally melting resin selected from the group consisting of polyvinyl alcohol resin, polyester resin and polyfluoroethylene resin mixed with inorganic lubricant;

said electrostatically charged particulate lubricant having a pre-determined mixture ratio of thermally melting resin to inorganic lubricant of between 1:99 and 99:1 by weight; and wherein said electrostatically charge particulate lubricant has a predetermined melt viscosity of between 100 and 10,000 poise at the forging temperature of said steel material.

2. The lubricant of claim 1 wherein said predetermined melt viscosity of said electrostatically charged lubricant is adjustable by varying said mixture ratio of thermally melting resin to inorganic lubricant and by varying a softening point of said thermally melting resin.

3. The lubricant of claim 1 wherein said predetermined mixture ratio is adjustable according to an amount of forging to be performed on said steel material and a forging temperature.

4. The lubricant of claim 1 wherein said predetermined melt viscosity is adjusted by adding a thickener to said electrostatically charged particulate lubricant.

5. The lubricant of claim 4 wherein said thickener is selected from the group consisting of colloidal silica, clay, talc titanium oxide and calcium carbonate.

6. The lubricant of claim 1 wherein said electrostatically charged particulate lubricant has a predetermined mixture ratio of thermally melting resin to inorganic lubricant of between 5:95 and 90:10 by weight.

7. An electrostatically charged and sprayable lubricant for forming a lubricant coating on the surface of an electrically grounded steel material to be forged, and on which said lubricant is electrostatically sprayed, comprising:

an electrostatically charged particulate lubricant of a thermally melting resin selected from the group consisting of polyvinyl alcohol resin, polyester resin and polyfluoroethylene resin mixed with inorganic lubricant;

said electrostatically charged particulate' lubricant having a pre-determined mixture ratio of thermally melting resin to inorganic lubricant of between 1:10 and 10:1 by weight; and wherein said electrostatically charge particulate lubricant has a predetermined melt viscosity of between 50 and 100,000 poise at the forging temperature of said steel material.

8. The lubricant of claim 7 wherein said electrostatically charged particulate lubricant has a predetermined mixture ratio of thermally melting resin to inorganic lubricant of between 5:95 and 90:10 by weight.

* * * * *